Jan. 3, 1967  C. S. OCHS  3,295,676
DETECTING MECHANISM
Filed Sept. 2, 1964  3 Sheets-Sheet 1
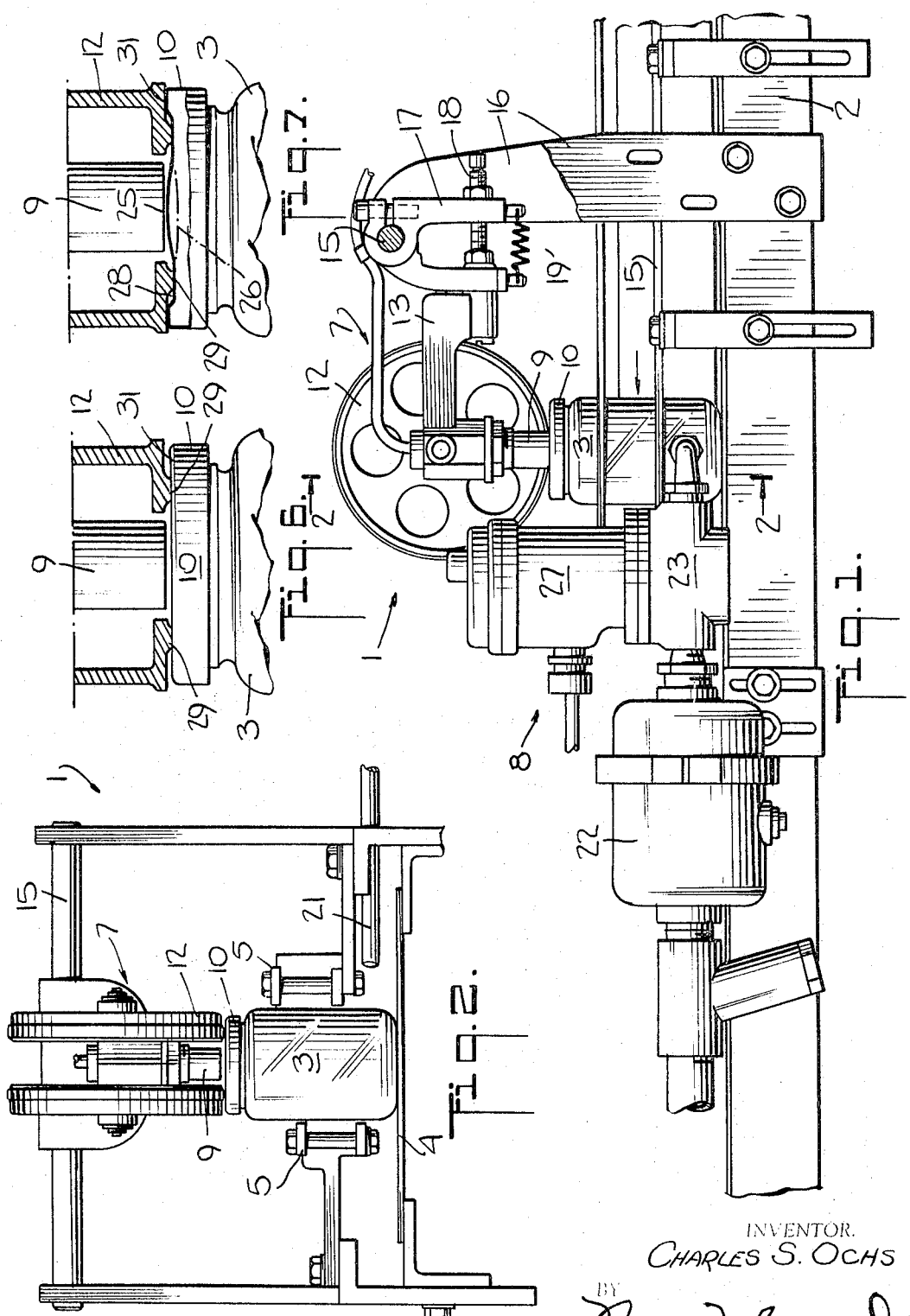
INVENTOR.
CHARLES S. OCHS
BY
ATTORNEY

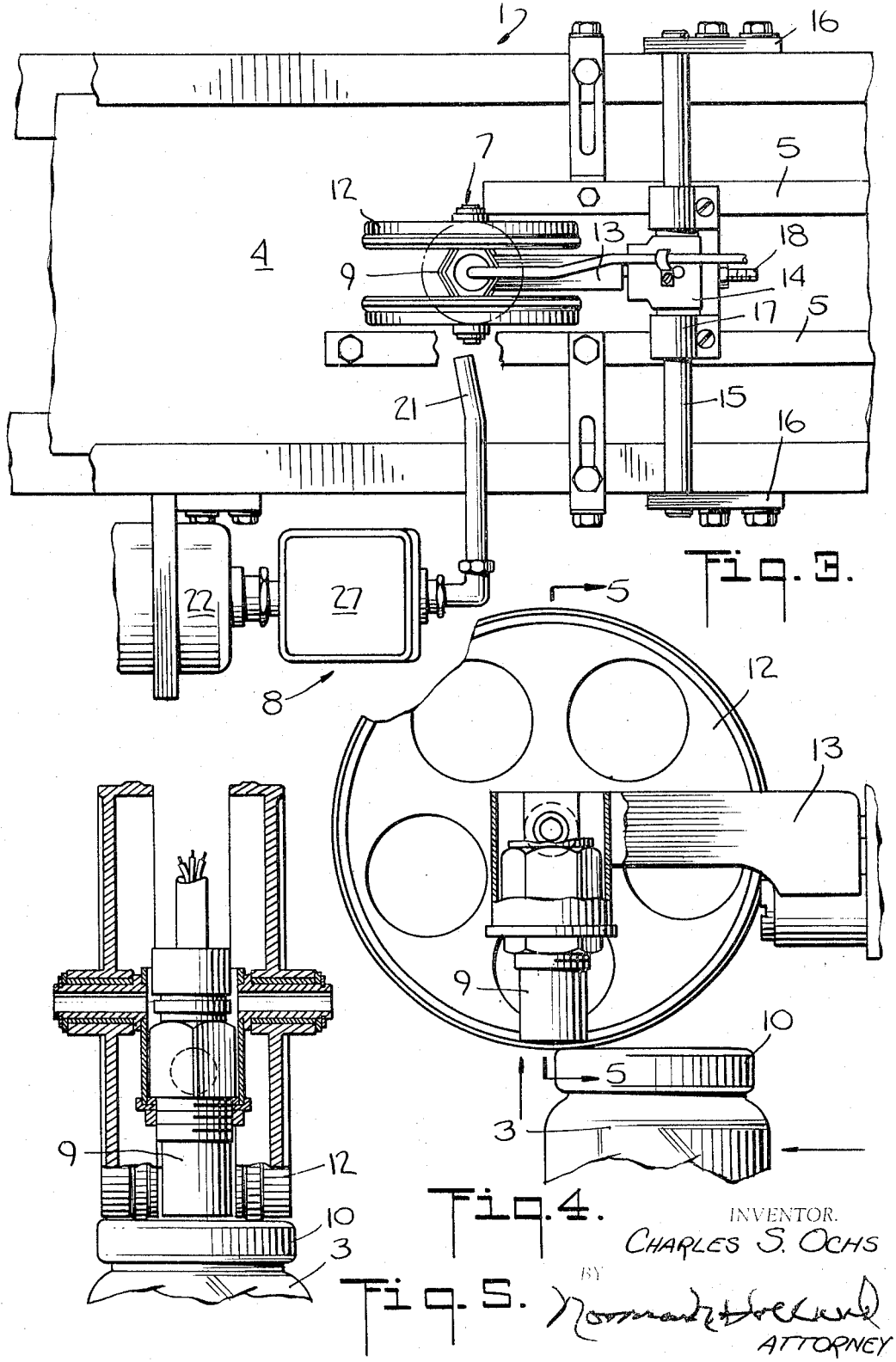

Jan. 3, 1967 C. S. OCHS 3,295,676
DETECTING MECHANISM
Filed Sept. 2, 1964 3 Sheets-Sheet 3
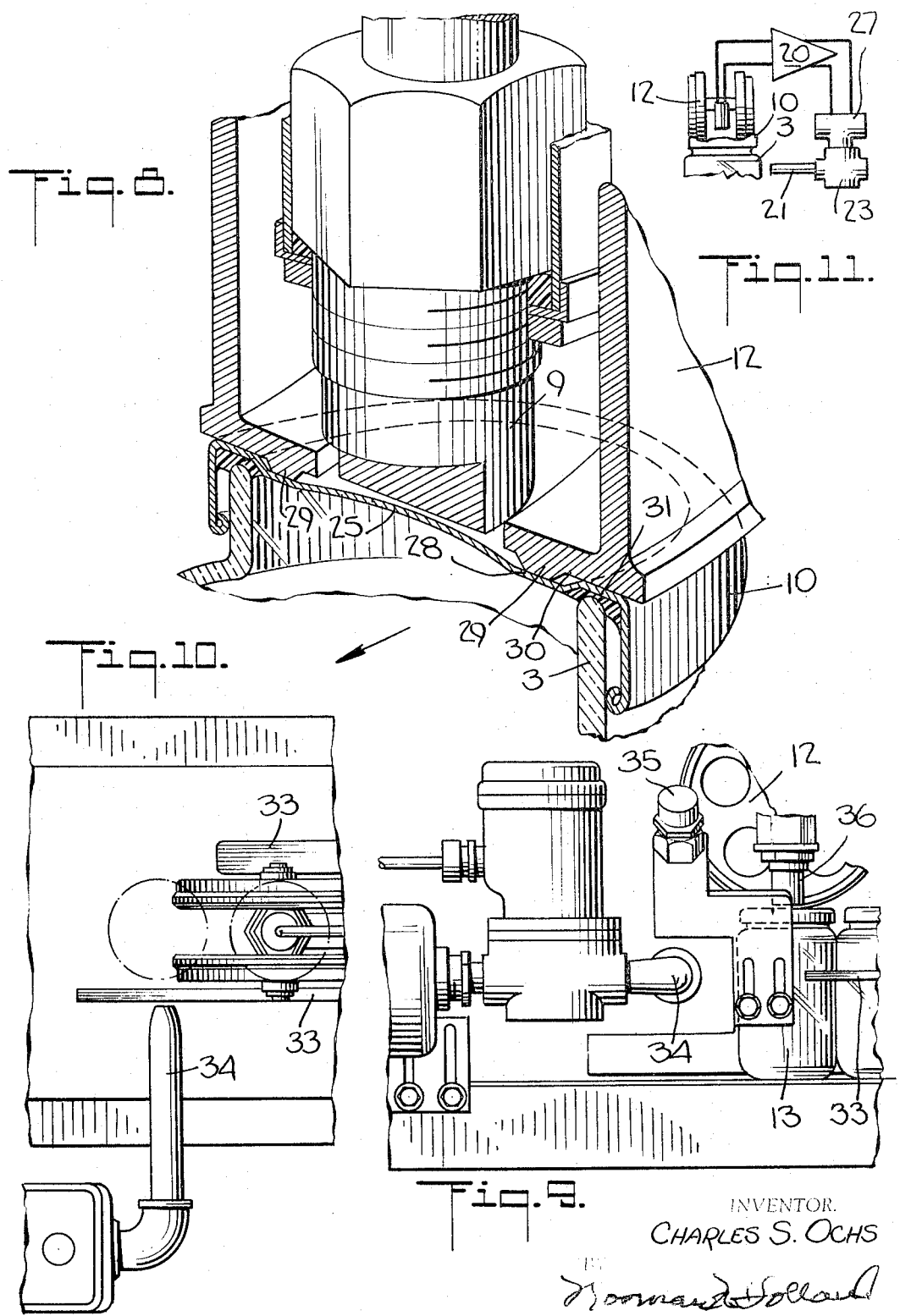
INVENTOR.
CHARLES S. OCHS
ATTORNEY

United States Patent Office 3,295,676
Patented Jan. 3, 1967

3,295,676
DETECTING MECHANISM
Charles S. Ochs, Lancaster, Ohio, assignor to Anchor Hocking Glass Corporation, Lancaster, Ohio, a corporation of Delaware
Filed Sept. 2, 1964, Ser. No. 393,952
6 Claims. (Cl. 209—111.8)

The present invention relates to an automatic inspection device for sealed containers and more particularly to an improved device for sensing the absence of a vacuum in sealed packages and for rejecting packages with insufficient vacuum.

A wide variety of food products are now packaged under vacuum to improve their storage life. Many of these products are packaged in containers filled through an open end or mouth which is thereafter sealed by a suitable closure cap or end cover. These closures or covers are made of metal in the form of closure caps or can covers and are threadedly connected or press fitted or otherwise attached to the body of the container. Many of these closures are formed of relatively thin metal and a domed center portion is provided which is known as a flip panel. The position of these panels provides an index of the vacuum within the sealed containers as containers having a suitably high vacuum draw the panels downwardly so that they assume a concave shape whereas containers known as duds having an improper vacuum permit the panels to remain or to spring outwardly to their normal unsealed position so that they have a convex or outwardly directed shape.

Vacuum detectors are known which determine the position of this center portion or flip panel and which thus determine whether or not the container is sealed with a proper vacuum.

Patent No. 3,064,807 owned by the assignee of the present application, for example, describes such a device employing a detector which is activated by closure flip panels where an improper vacuum has failed to draw the flip panel or center portion of the closure downwardly in the normal manner. In the detecting device of this patent and other types of dud detectors a timing device is provided to activate the flip panel detecting means only when a container is accurately centered beneath the detecting device. Such timing means have comprised additional proximity detectors or electric switches and their related circuitry.

The present invention provides an improved dud detecting sensor having a relatively simple and efficient means for actuating the detector only when centered on containers and which eliminates the timing devices and their related circuits.

A novel support means is provided for the sensing element which cooperates with the container caps or covers to physically position the detecting element in its dud detecting position only when the containers are centered beneath the sensor.

Accordingly the object of the present invention is to provide an improved means for detecting the absence of a vacuum in sealed containers.

Another object of the invention is to provide a simplified means for activating the sensing element of a container dud detector.

Another object of the invention is to provide a simplified sensing element for a container dud detector.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of a dud detector in accordance with the present invention;

FIG. 2 is a vertical sectional view of the dud detector taken along line 2—2 of FIG. 1;

FIG. 3 is a top plan view of the dud detector of FIG. 1;

FIG. 4 is an enlarged detailed view of the preferred embodiment of the sensor element;

FIG. 5 is a vertical sectional view of the sensor taken along line 5—5 of FIG. 4;

FIGS. 6 and 7 are fragmentary vertical sectional views of the sensor illustrating its operation on a closure cap;

FIG. 8 is an enlarged perspective view of the sensor FIG. 4;

FIG. 9 is a side elevational view of another embodiment of the dud detector;

FIG. 10 is a top plan view of the dud detector of FIG. 9; and

FIG. 11 is a diagrammatic view of the dud detector.

The dud detector 1 is illustrated in FIGS. 1 thru 3 in position on a suitable container conveyor 2. Sealed containers 3 are being carried on conveyor 2 on a moving conveyor belt 4 and are centered thereon by adjustably mounted guide rails 5. The dud detector of the present invention includes a sensing device indicated generally at 7 which detects the duds and a cooperating and interconnected container ejector indicated generally at 8 which ejects the duds. The sensing device includes a sensor 9 for detecting the position of the flip panels on the caps 10 and a sensor positioning means which in the preferred embodiment is a wheel 12 rotatably mounted on a support arm 13. The support arm 13 is pivotally attached at 14 (FIG. 3) to a horizontal mounting shaft 15 supported on spaced posts 16. A wheel positioning stop 17 is fixedly attached to the horizontal mounting shaft 15 and a stop screw 18 adjustably sets the position of the lower surface of the wheel 12 slightly below the tops of the container caps 10 so that the caps 10 support and determine the vertical position of the wheel 12 and the sensor 9 as the caps 10 pass beneath the wheel 12. A suitable tension spring 19 holds the wheel 12 lightly against the moving cap 10 tops and returns the wheel 12 to its downward position after it leaves each container 3.

As will be more fully described below, a container 3 having an improper vacuum, i.e., a dud, will generate a signal through the operation of the sensor 9 and its related amplifier 20 (FIG. 11). This signal is applied to an ejector 8 including an air nozzle 21 coupled to a suitable source 22 of air under high pressure through an electrically controlled valve 23. The signal from the sensor 9 indicating a dud opens the valve 23 thereby releasing a blast of air and removing the defective container from the conveyor 2. This container ejector means 8 illustrated is a preferred embodiment for cooperating with the novel sensing device 7 of the present invention. Other container ejector means may be used such as an electrically operated and controlled plunger or an air piston activated by the signal generated by the sensor 9 and its related control circuit 20.

The sensing means 7 will now be described in greater detail with particular reference to FIGS. 4 through 8 illustrating the details of the preferred embodiment of the sensing means. As indicated above the sensing means 7 detects the absence of a proper vacuum in a sealed package by detecting the position of the flip panel 25 in the container cap 10. FIGS. 7 and 8 include sectional showings of typical closure caps 10 used in vacuum sealing. These caps 10 have the flexible center portion or flip panel 25 initially shaped during the closure manufacture to have the convex or domed shape illustrated in FIGS. 7 and 8. Prior to the application or when applied to a container having little or no vacuum, this flip panel 25 remains in its raised position. When the caps are applied to evacuated containers, atmospheric pressure forces the flip panel 25 downwardly so that it assumes the concave form illustrated by the dash-dot line 26 in FIG. 7.

The sensor 9 and its cooperating support wheel 12 detect whether the flip panel is up or down. The preferred sensor 9 is a proximity detector head commercially obtainable with its related control circuit and being adjustable to generate an electrical output control signal when it comes within a pre-determined distance of a metallic object. Thus, in the case of the container illustrated in FIGS. 7 and 8 and where the flip panel 25 is raised indicating little or no vacuum, the proximity of the raised flip panel 25 to this sensor 9 causes a control signal to be generated in its related control circuit. This control signal is coupled to the control solenoid 27 for the air valve 23 and thus opens the air valve 23 to eject the container determined to be a dud.

It is necessary, however, to activate the sensor 9 only when it is positioned centrally over the closure cap 10 to eliminate spurious ejection signals which would otherwise be generated when the sensor passes the cap edges.

This is accomplished by the dud detector of the present invention by the cooperating wheel 12 in the following manner.

Caps or covers having flip panels also include an annular recessed portion 28 inwardly of the cap edges which is formed during cap manufacture both to provide a stacking panel for containers and to facilitate the formation of the flip panel 25. The wheel 12, as best seen in FIGS. 5 through 7, includes a pair of leveling members or flanges 29 extending outwardly from the outer wheel surface 30 adapted to enter the annular recess 28 of the cap 10 thereby lowering sensor 9 to its pre-determined sensing position only when the wheel 12 is centered with respect to the closure cap 10. As illustrated in FIGS. 4 through 6 the spaced flanges 29 engage the raised rim portion 31 of the cap 10 as the cap rim 31 moves beneath the sensor 9 so that the wheel 12 holds the sensor 9 well above the metallic cap rim and at a distance sufficiently great to be insensitive to the presence of the cap rim 31. When the wheel 12 reaches the mid position on the moving container cap 10 as is best seen in FIGS. 7 and 8, the sensor 9 will remain unactivated where the flip panels 25 have been drawn down, as best seen by the dash-dot line 26 on FIG. 7, but will be activated by the raised flip panel 25 of the dud container as illustrated by the flip panel 25 as shown in solid lines in FIG. 7. It is thus clear that the novel support wheel 12 in combination with the sensor 9 eliminates the need for a timing device and provides an accurate, reliable, and relatively simple means for controlling the sensor 9 operation even for a high-speed dud detection operation.

While a freely rotating wheel is preferred for providing the above positioning action due to its minimum interference with the moving containers 10, it is clear that a similar spacing action can be obtained by a floating shoe or other means having a leveling action generally similar to that illustrated in FIGS. 5 through 8 where the position of the sensor is determined by contact elements which enter the annular depression on the container cover. It is also clear that a singular flange or enlargement properly situated may be used.

The proximity detecting head is also preferred since it is the trouble-free and effective and readily adjusted, however, it is also clear that other sensing devices capable of detecting the height variations of the flip panel such as a micro-switch or other detecting device can be used in combination with the support means as described above.

The above described positioning wheel 12 would also operate for closures or covers having no raised rim or edge as the flanges 29 would still provide a proper spacing when the cap was centered beneath the sensor 9 and would hold the sensor 9 at an ineffective level otherwise as the wheel passed over the cap edges.

FIGS. 1 through 3 illustrate the sensing device mounted on a conveyor system where the containers pass through it in spaced relation and without back pressure. This permits the immediate ejection of dud containers at the sensing station and permits the air-nozzle or other ejection means to be positioned as illustrated in FIG. 3.

FIGS. 9 and 10 illustrate the sensing device of the present invention used where the containers 32 may be in contact with one another and subject to back pressure so that the spacing rails 33 extend beneath the sensing position. In this embodiment, the ejection means such as the air nozzle 34 is positioned beyond the sensing position and means is provided such as a second detector 35 which is coupled to complete the activation of the air nozzle 34 only after the container 32 has moved beyond the sensor 36 and clear of the rails 33.

It will be seen that an improved dud detector has been provided and in particular an improved sensing device including the novel sensor control means which eliminates the need for a timing device such as is normally used to activate the sensor when the containers reach the sensing position. The sensing device and its cooperating container ejector means provides a rugged, reliable, and simplified detecting operation capable of high-speed and trouble-free operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A sensing device for a dud detector for use with closure caps having a flexible vacuum indicating flip panel surrounded by a panel supporting surface and having a raised rim outwardly of the supporting surface comprising the combination of a conveyor for capped containers, a panel position sensor element, means for ejecting containers from said conveyor coupled to said sensor element, and a sensor support wheel having annular flanges for engaging said panel supporting surface and for positioning the sensor element a pre-determined distance from said supporting surface when said sensor is centered above said flip panel and for spacing said sensor from said closure cap rim.

2. A sensing device for a dud detector for use with closures having an indicator panel having a normal outward convex shape and adapted for being drawn inwardly by a container vacuum to a concave shape and having a stable annular zone surrounding the panel at a level intermediate the convex and concave positions of the panel comprising the combination of a conveyor for capped containers, a sensor for detecting the position of said panel, means for ejecting container from said conveyor coupled to said sensor, and a wheel having an annular support flange on its outer surface for engaging said annular zone and for supporting said sensor at a pre-determined distance from the panel in its convex shape.

3. A sensing device for a dud detector for use with closures having an indicator panel having a normal outward convex shape and adapted for being drawn inwardly by a container vacuum to a concave shape and having a stable annular zone surrounding the panel at a level intermediate the convex and concave positions of the panel and having a raised rim outwardly of said zone comprising the combination of a conveyor for capped containers, a proximity detector sensor for detecting the position of said panel, means for ejecting container from said conveyor coupled to said sensor, and a wheel having an annular support flange on its outer surface for engaging said annular zone and for supporting said sensor at a predetermined distance from the panel in its convex shape and for spacing said sensor from the closure rim.

4. A sensing device for a dud detector for sealed packages sealed with closure caps having a flexible vacuum indicating panel surrounded by a panel supporting surface and having a raised rim outwardly of the panel supporting surface comprising the combination of a conveyor for capped containers, a panel position sensor, means for ejecting container from said conveyor coupled to said sensor, support means for said sensor, and cap engaging means on said sensor support means positioned for engaging the closure cap rim for raising the sensor a predetermined distance above the rim as the rim passes beneath the sensor and positioned for engaging said panel supporting surface for positioning the sensor the predetermined distance above said indicator panel when the sensor is centered thereabove.

5. The combination as claimed in claim 4 in which said sensor comprises a metal sensitive proximity detector.

6. A sensing device for a dud detector for sealed packages sealed with closure caps having a flexible vacuum indicating panel surrounded by a raised rim comprising the combination of a conveyor for sealed packages, a panel position sensor, means for ejecting container from said conveyor coupled to said sensor, support means for said sensor, first cap engaging means on said sensor support means positioned for engaging the closure cap rim for raising the sensor a predetermined distance above the rim as the rim passes beneath the sensor and positioned inwardly of the rim when the sensor is centered above the cap, and second cap engaging means positioned at a predetermined level above said first cap engaging means and outwardly thereof and positioned above the cap rim when the sensor is centered above the cap.

References Cited by the Examiner
UNITED STATES PATENTS

| | | | |
|---|---|---|---|
| 2,252,424 | 8/1941 | Bigelow | 324—37 |
| 2,400,507 | 5/1946 | Henszey | 209—88 X |
| 2,689,647 | 9/1954 | Hofstetter | 209—90 |
| 2,900,596 | 8/1959 | Drake | 324—37 |
| 3,206,025 | 9/1965 | Ochs | 209—88 |
| 3,206,027 | 9/1965 | Bailey | 209—111.8 |

M. HENSON WOOD, JR., *Primary Examiner.*

ROBERT B. REEVES, *Examiner.*

R. A. SCHACHER, *Assistant Examiner.*